United States Patent
Gordon et al.

(10) Patent No.: US 11,460,308 B2
(45) Date of Patent: Oct. 4, 2022

(54) SELF-DRIVING VEHICLE'S RESPONSE TO A PROXIMATE EMERGENCY VEHICLE

(71) Applicant: DoorDash, Inc., San Francisco, CA (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: DoorDash, Inc., San Francisco, CA (US)

( * ) Notice: Subject to any disclaimer, the term of this patent is extended or adjusted under 35 U.S.C. 154(b) by 541 days.

(21) Appl. No.: 15/814,559

(22) Filed: Nov. 16, 2017

(65) Prior Publication Data
US 2018/0080779 A1 Mar. 22, 2018

Related U.S. Application Data

(63) Continuation of application No. 14/815,361, filed on Jul. 31, 2015, now Pat. No. 9,869,560.

(51) Int. Cl.
*G01C 21/34* (2006.01)
*G05D 1/00* (2006.01)
(Continued)

(52) U.S. Cl.
CPC ......... *G01C 21/3415* (2013.01); *B60W 30/00* (2013.01); *G01C 21/3492* (2013.01);
(Continued)

(58) Field of Classification Search
CPC ........... G01C 21/3415; G01C 21/3492; B60W 30/00; G05D 1/0027; G05D 1/0061; G05D 1/0212
(Continued)

(56) References Cited

U.S. PATENT DOCUMENTS

| 4,665,395 A | 5/1987 | Van Ness |
| 4,908,988 A | 3/1990 | Yamamura et al. |

(Continued)

FOREIGN PATENT DOCUMENTS

| CA | 2447554 A1 | 11/2000 |
| CN | 1135063 | 11/1996 |

(Continued)

OTHER PUBLICATIONS

R. Vaidyanathan et al., "A Reflexive Vehicle Control Architecture Based on a Neural Model of the Cockroach Escape Response", Institution of Mechanical Engineers. Journal of Systems and Control Engineering, 2011, vol. 226, No. 5, pp. 699-718.

(Continued)

*Primary Examiner* — Isaac G Smith
(74) *Attorney, Agent, or Firm* — Kilpatrick Townsend & Stockton LLP

(57) ABSTRACT

A computer-implemented method, system, and/or computer program product controls self-driving vehicles (SDVs). An emergency message is transmitted to a receiver within a self-driving vehicle (SDV). The emergency message describes an emergency state of an emergency vehicle and an identified future route of the emergency vehicle, where the identified future route is a planned route to an emergency destination for the emergency vehicle that includes a first pathway. In response to the SDV receiving the emergency message, the SDV is redirected, via an auto-control hardware system on the SDV, to drive to a second pathway that does not conflict with the identified future route of the emergency vehicle.

20 Claims, 9 Drawing Sheets

(51) Int. Cl.
*G05D 1/02* (2020.01)
*B60W 30/00* (2006.01)

(52) U.S. Cl.
CPC ......... *G05D 1/0027* (2013.01); *G05D 1/0061* (2013.01); *G05D 1/0212* (2013.01); *G05D 1/0295* (2013.01); *G05D 2201/0213* (2013.01)

(58) Field of Classification Search
USPC .................................................. 701/26, 23
See application file for complete search history.

(56) References Cited

U.S. PATENT DOCUMENTS

| | | | |
|---|---|---|---|
| 5,781,119 A * | | 7/1998 | Yamashita ............ G05D 1/024 180/168 |
| 5,975,791 A | | 11/1999 | McCulloch |
| 6,064,970 A | | 5/2000 | McMillan et al. |
| 6,201,318 B1 | | 3/2001 | Guillory |
| 6,326,903 B1 | | 12/2001 | Gross et al. |
| 6,393,362 B1 | | 5/2002 | Burns |
| 6,502,035 B2 | | 12/2002 | Levine |
| 6,587,043 B1 | | 7/2003 | Kramer |
| 6,622,082 B1 | | 9/2003 | Schmidt et al. |
| 6,731,202 B1 | | 5/2004 | Klaus |
| 6,810,312 B2 | | 10/2004 | Jammu et al. |
| 7,124,088 B2 | | 10/2006 | Bauer et al. |
| 7,580,782 B2 | | 8/2009 | Breed et al. |
| 7,769,544 B2 | | 8/2010 | Blesener et al. |
| 7,877,269 B2 | | 1/2011 | Bauer et al. |
| 7,894,951 B2 | | 2/2011 | Norris et al. |
| 7,979,173 B2 | | 7/2011 | Breed |
| 8,031,062 B2 | | 10/2011 | Smith |
| 8,045,455 B1 | | 10/2011 | Agronow et al. |
| 8,078,349 B1 | | 12/2011 | Prada Gomez et al. |
| 8,090,598 B2 | | 1/2012 | Bauer et al. |
| 8,139,109 B2 | | 3/2012 | Schmiedel et al. |
| 8,140,358 B1 | | 3/2012 | Ling et al. |
| 8,146,703 B2 | | 4/2012 | Baumann et al. |
| 8,152,325 B2 | | 4/2012 | McDermott |
| 8,180,322 B2 | | 5/2012 | Lin et al. |
| 8,346,480 B2 | | 1/2013 | Trepagnier et al. |
| 8,352,112 B2 | | 1/2013 | Mudalige |
| 8,442,854 B2 | | 5/2013 | Lawton et al. |
| 8,466,807 B2 | | 6/2013 | Mudalige |
| 8,489,434 B1 | | 7/2013 | Otis et al. |
| 8,583,365 B2 | | 11/2013 | Jang et al. |
| 8,660,734 B2 | | 2/2014 | Zhu et al. |
| 8,676,466 B2 | | 3/2014 | Mudalige |
| 8,678,701 B1 | | 3/2014 | Aldasem |
| 8,781,964 B2 | | 7/2014 | Martin et al. |
| 8,786,461 B1 | | 7/2014 | Daudelin |
| 8,810,392 B1 | | 8/2014 | Teller et al. |
| 8,816,857 B2 | | 8/2014 | Nordin et al. |
| 8,838,321 B1 * | | 9/2014 | Ferguson ............ G05D 1/0214 701/23 |
| 8,874,305 B2 | | 10/2014 | Dolgov et al. |
| 8,880,270 B1 | | 11/2014 | Ferguson et al. |
| 8,892,451 B2 | | 11/2014 | Everett |
| 8,903,591 B1 | | 12/2014 | Ferguson et al. |
| 8,923,890 B1 | | 12/2014 | White et al. |
| 8,928,479 B2 | | 1/2015 | Gonsalves et al. |
| 8,935,034 B1 | | 1/2015 | Zhu |
| 8,948,955 B2 | | 2/2015 | Zhu et al. |
| 8,949,016 B1 | | 2/2015 | Ferguson et al. |
| 8,954,217 B1 | | 2/2015 | Montemerlo et al. |
| 8,954,252 B1 | | 2/2015 | Urmson et al. |
| 8,954,261 B2 | | 2/2015 | Das et al. |
| 8,958,943 B2 | | 2/2015 | Bertosa et al. |
| 8,965,621 B1 | | 2/2015 | Urmson et al. |
| 8,970,362 B2 | | 3/2015 | Morley et al. |
| 8,983,705 B2 | | 3/2015 | Zhu et al. |
| 8,996,224 B1 | | 3/2015 | Herbach et al. |
| 9,014,905 B1 | | 4/2015 | Kretzschmar et al. |
| 9,024,787 B2 | | 5/2015 | Alshinnawi et al. |
| 9,123,049 B2 | | 9/2015 | Hyde et al. |
| 9,170,327 B2 | | 10/2015 | Choe et al. |
| 9,189,897 B1 | | 11/2015 | Stenneth |
| 9,194,168 B1 | | 11/2015 | Lu et al. |
| 9,216,745 B2 | | 12/2015 | Beardsley et al. |
| 9,218,698 B2 | | 12/2015 | Ricci |
| 9,286,520 B1 | | 3/2016 | Lo et al. |
| 9,317,033 B2 | | 4/2016 | Ibanez-guzman et al. |
| 9,381,915 B1 | | 7/2016 | Crombez et al. |
| 9,390,451 B1 | | 7/2016 | Slusar |
| 9,399,472 B2 | | 7/2016 | Minoiu-Enache |
| 9,463,805 B2 | | 10/2016 | Kirsch et al. |
| 9,483,948 B1 | | 11/2016 | Gordon et al. |
| 9,524,648 B1 | | 12/2016 | Gopalakrishnan et al. |
| 9,552,735 B2 | | 1/2017 | Pilutti et al. |
| 9,566,958 B2 | | 2/2017 | Waldmann |
| 9,566,986 B1 | | 2/2017 | Gordon et al. |
| 9,587,952 B1 | | 3/2017 | Slusar |
| 9,628,975 B1 | | 4/2017 | Watkins et al. |
| 9,646,496 B1 | | 5/2017 | Miller |
| 9,718,468 B2 | | 8/2017 | Barfield et al. |
| 9,754,235 B1 | | 9/2017 | Konrardy |
| 9,834,224 B2 | | 12/2017 | Gordon et al. |
| 9,944,291 B2 | | 4/2018 | Gordon |
| 10,042,359 B1 | | 8/2018 | Konrardy |
| 10,093,322 B2 | | 10/2018 | Gordon |
| 2002/0026841 A1 | | 3/2002 | Svendsen |
| 2002/0128774 A1 | | 9/2002 | Takezaki et al. |
| 2003/0065572 A1 | | 4/2003 | McNee et al. |
| 2003/0076981 A1 | | 4/2003 | Smith et al. |
| 2004/0078133 A1 | | 4/2004 | Miller |
| 2004/0117086 A1 | | 6/2004 | Rao et al. |
| 2004/0128062 A1 * | | 7/2004 | Ogino ................ G01C 21/3697 701/400 |
| 2004/0199306 A1 | | 10/2004 | Helmann et al. |
| 2005/0021227 A1 | | 1/2005 | Matsumoto et al. |
| 2005/0104745 A1 | | 5/2005 | Bachelder et al. |
| 2006/0106671 A1 | | 5/2006 | Biet |
| 2006/0163939 A1 | | 7/2006 | Kuramochi et al. |
| 2006/0200379 A1 | | 9/2006 | Biet |
| 2006/0241855 A1 | | 10/2006 | Joe et al. |
| 2007/0100687 A1 | | 5/2007 | Yoshikawa |
| 2007/0124027 A1 | | 5/2007 | Betzitza et al. |
| 2007/0265754 A1 | | 11/2007 | Curtis et al. |
| 2008/0048850 A1 | | 2/2008 | Yamada |
| 2008/0065293 A1 | | 3/2008 | Placke et al. |
| 2008/0114663 A1 | | 5/2008 | Watkins et al. |
| 2008/0129475 A1 | | 6/2008 | Breed et al. |
| 2008/0201217 A1 | | 8/2008 | Bader et al. |
| 2008/0288406 A1 | | 11/2008 | Seguin et al. |
| 2009/0094109 A1 | | 4/2009 | Aaronson et al. |
| 2009/0138168 A1 | | 5/2009 | Labuhn et al. |
| 2009/0248231 A1 | | 10/2009 | Kamiya |
| 2009/0313096 A1 | | 12/2009 | Kama |
| 2010/0057511 A1 | | 3/2010 | Mansouri et al. |
| 2010/0156672 A1 | | 6/2010 | Yoo et al. |
| 2010/0179720 A1 | | 7/2010 | Lin et al. |
| 2010/0228427 A1 | | 9/2010 | Anderson et al. |
| 2010/0256852 A1 | | 10/2010 | Mudalige |
| 2011/0029173 A1 | | 2/2011 | Hyde et al. |
| 2011/0035250 A1 | | 2/2011 | Finucan |
| 2011/0077807 A1 | | 3/2011 | Hyde et al. |
| 2011/0077808 A1 | | 3/2011 | Hyde et al. |
| 2011/0137699 A1 | | 6/2011 | Ben-Ari et al. |
| 2011/0264521 A1 | | 10/2011 | Straka |
| 2012/0072243 A1 | | 3/2012 | Collins et al. |
| 2012/0078506 A1 * | | 3/2012 | Husain ............ G08G 1/096811 701/414 |
| 2012/0083960 A1 | | 4/2012 | Zhu |
| 2012/0123646 A1 | | 5/2012 | Mantini |
| 2012/0139756 A1 | | 6/2012 | Djurkovic |
| 2012/0277947 A1 | | 11/2012 | Boehringer et al. |
| 2012/0293341 A1 | | 11/2012 | Lin |
| 2013/0030657 A1 | | 1/2013 | Chatterjee et al. |
| 2013/0113634 A1 | | 5/2013 | Hutchinson et al. |
| 2013/0131949 A1 | | 5/2013 | Shida |
| 2013/0144502 A1 | | 6/2013 | Shida |
| 2013/0231824 A1 | | 9/2013 | Wilson et al. |
| 2013/0261871 A1 | | 10/2013 | Hobbs et al. |
| 2013/0304513 A1 | | 11/2013 | Hyde et al. |

(56) References Cited

U.S. PATENT DOCUMENTS

| | | |
|---|---|---|
| 2013/0304514 A1 | 11/2013 | Hyde |
| 2013/0338868 A1* | 12/2013 | Essame ............ B60W 30/18163 |
| | | 701/23 |
| 2014/0019259 A1 | 1/2014 | Dung et al. |
| 2014/0032049 A1 | 1/2014 | Moshchuk et al. |
| 2014/0088850 A1 | 3/2014 | Schuberth |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0278052 A1* | 9/2014 | Slavin ................. G08G 1/0145 |
| | | 701/400 |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0061895 A1* | 3/2015 | Ricci ..................... G06Q 10/20 |
| | | 340/902 |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0097866 A1 | 4/2015 | Mochizuki |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0170287 A1 | 6/2015 | Tirone |
| 2015/0187019 A1 | 7/2015 | Fernandes |
| 2015/0193731 A1 | 7/2015 | Stevens et al. |
| 2015/0196256 A1 | 7/2015 | Venkatraman et al. |
| 2015/0210280 A1 | 7/2015 | Agnew et al. |
| 2015/0232065 A1 | 8/2015 | Ricci et al. |
| 2015/0235480 A1 | 8/2015 | Cudak |
| 2015/0235557 A1 | 8/2015 | Engelman |
| 2015/0242953 A1 | 8/2015 | Suiter |
| 2015/0248689 A1 | 9/2015 | Paul et al. |
| 2015/0266455 A1* | 9/2015 | Wilson ................. B60W 30/10 |
| | | 701/93 |
| 2015/0269536 A1 | 9/2015 | Parris |
| 2015/0293994 A1 | 10/2015 | Kelly |
| 2015/0338226 A1 | 11/2015 | Mason et al. |
| 2015/0339639 A1 | 11/2015 | Choe |
| 2015/0348112 A1 | 12/2015 | Ramanujam et al. |
| 2016/0001781 A1 | 1/2016 | Fung et al. |
| 2016/0026182 A1 | 1/2016 | Boroditsky et al. |
| 2016/0063761 A1 | 3/2016 | Sisbot et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0098926 A1* | 4/2016 | Probert ................... G08G 1/123 |
| | | 340/903 |
| 2016/0139594 A1 | 5/2016 | Okumura et al. |
| 2016/0140507 A1 | 5/2016 | Stevens et al. |
| 2016/0176409 A1* | 6/2016 | Kirsch .................. A61M 21/02 |
| | | 701/37 |
| 2016/0187150 A1 | 6/2016 | Sherman et al. |
| 2016/0202700 A1 | 7/2016 | Sprigg |
| 2016/0205146 A1 | 7/2016 | Sugioka et al. |
| 2016/0221768 A1 | 8/2016 | Kadaba |
| 2016/0239798 A1 | 8/2016 | Borley et al. |
| 2016/0264131 A1* | 9/2016 | Chan .................... A61B 5/4875 |
| 2016/0303969 A1 | 10/2016 | Akula |
| 2016/0304122 A1 | 10/2016 | Herzog et al. |
| 2016/0334797 A1 | 11/2016 | Ross et al. |
| 2016/0344737 A1 | 11/2016 | Anton |
| 2016/0355192 A1 | 12/2016 | James et al. |
| 2016/0358477 A1 | 12/2016 | Ansari |
| 2016/0364823 A1 | 12/2016 | Cao |
| 2016/0368534 A1 | 12/2016 | Harda |
| 2016/0371977 A1 | 12/2016 | Wingate |
| 2016/0375862 A1 | 12/2016 | Ito et al. |
| 2017/0001650 A1 | 1/2017 | Park |
| 2017/0010613 A1 | 1/2017 | Fukumoto |
| 2017/0021830 A1 | 1/2017 | Feldman et al. |
| 2017/0021837 A1 | 1/2017 | Ebina |
| 2017/0032585 A1 | 2/2017 | Stenneth |
| 2017/0057542 A1 | 3/2017 | Kim et al. |
| 2017/0061798 A1 | 3/2017 | Linder |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0129335 A1 | 5/2017 | Lu |
| 2017/0129487 A1 | 5/2017 | Wulf |
| 2017/0137023 A1 | 5/2017 | Anderson et al. |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0219364 A1 | 8/2017 | Lathrop |
| 2017/0248949 A1 | 8/2017 | Moran et al. |
| 2017/0300855 A1 | 10/2017 | Lund |
| 2018/0032071 A1 | 2/2018 | Wieneke |
| 2018/0072323 A1 | 3/2018 | Gordon |
| 2018/0075309 A1 | 3/2018 | Sathyanarayana et al. |
| 2018/0086373 A1 | 3/2018 | Tamura |
| 2018/0093631 A1 | 4/2018 | Lee et al. |
| 2018/0108369 A1 | 4/2018 | Gross |
| 2018/0141453 A1 | 5/2018 | High |
| 2018/0154906 A1 | 6/2018 | Dudar |
| 2018/0203455 A1 | 7/2018 | Cronin |
| 2018/0265054 A1 | 9/2018 | Hofmann |
| 2018/0371805 A1 | 12/2018 | Ichinose |

FOREIGN PATENT DOCUMENTS

| | | |
|---|---|---|
| CN | 2349068 Y | 11/1999 |
| CN | 1376599 A | 10/2002 |
| CN | 201004265 Y | 1/2008 |
| CN | 201635568 U | 11/2010 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 | 2/1994 |
| GB | 2498793 A | 7/2013 |
| WO | 2006003661 A2 | 1/2006 |
| WO | 2014058263 | 4/2014 |
| WO | 2014066721 | 5/2014 |
| WO | 2014147361 | 9/2014 |
| WO | 2014148975 | 9/2014 |

(56) References Cited

FOREIGN PATENT DOCUMENTS

| WO | 2014148976 | | 9/2014 |
|---|---|---|---|
| WO | 2015024616 | | 2/2015 |
| WO | 2015056105 | | 4/2015 |
| WO | 2015156146 | A1 | 10/2015 |

OTHER PUBLICATIONS

Anonymous, 'System and Method to Target Advertisements for the Right Focus Group'. ip.com, No. 000218285, May 31, 2012, pp. 1-2.
Anonymous, "Car Built-In Mechanism to Enforce Mandatory Self-Driving Mode", ip.com, No. 000234916, Feb. 14 2014, pp. 1-3.
T. Horberry et al., "Driver Distraction: the Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technology's Benefits, Potential Risks, and Solutions", The Energy Collective, theenergycollective.com, Aug. 19, 2014, pp. 1-7.
Chen S, et al., "A Crash Risk Assessment Model for Roas Curves". Inproceedings 20th International Technical Conference on the Enhanced Saftey of Vehicles., 2007. Lyon, France.
J. Wei et al., "Towards a Viable Autonomous Driving Research Platform", IEEE, Intelligent Vehicles Symposium (IV), 2013, pp. 1-8.
Anonymous, "Diagnostics Mechanism for Self-Driving Cars to Validate Self-Driving Capabilities", ip.com, Jun. 6, 2014, pp. 1-5. ip.com.
Brownell, "Shared Autonomous Taxi Networks: An Analysis of Transportation Demand in NJ and a 21st Century Solution for Congestion", Dissertation, Princeton University, 2013, pp. 1-122.
Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.
Lutin et al., "The Revolutionary Development of Self-Driving Vehicles and Implications for the Transportation Engineering Profession", ITE Journal 83.7, 2013, pp. 28-32.
A. Hars, "Self-Driving Cars: The Digital Transformation of Mobility", Marktplatze Im Umbruch, Springer Berlin Heidelberg, 2015, pp. 539-549.
Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.
Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.
C. Berger et al., "Cots-Architecture With a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.
P. Mell et al., "NIST Definition Fo Cloud Computing", National Institute of Standards and Tchnology, Information Technology Labratory, Sep. 2011, pp. 1-7.
U.S. Appl. No. 14/815,361 Non-Final Office Action dated Sep. 23, 2016.
U.S. Appl. No. 14/815,361 Final Office Action dated Jun. 15, 2017.
List of IBM Patents or Patent Applications Treated as Related. Oct. 18, 2017.

\* cited by examiner

SELF-DRIVING VEHICLE'S RESPONSE TO A PROXIMATE EMERGENCY VEHICLE

BACKGROUND

The present disclosure relates to the field of vehicles, and specifically to the field of self-driving vehicles. Still more specifically, the present disclosure relates to the field of self-driving vehicles responding to nearby emergency vehicles.

Self-driving vehicles (SDVs) are vehicles that are able to autonomously drive themselves through private and/or public spaces. Using a system of sensors that detect the surroundings of the SDV, logic within or associated with the SDV controls the propulsion, stopping, and steering of the SDV based on the sensor-detected surroundings of the SDV.

SUMMARY

A computer-implemented method controls self-driving vehicles (SDVs). An emergency message is transmitted to a receiver within a self-driving vehicle (SDV). The emergency message describes an emergency state of an emergency vehicle and an identified future route of the emergency vehicle, where the identified future route is a planned route to an emergency destination for the emergency vehicle that includes a first pathway. In response to the SDV receiving the emergency message, the SDV is redirected, via an auto-control hardware system on the SDV, to drive to a second pathway that does not conflict with the identified future route of the emergency vehicle.

A computer program product and/or computer system controls self-driving vehicles (SDVs). An emergency message is transmitted to a receiver within a self-driving vehicle (SDV). The emergency message describes an emergency state of an emergency vehicle and an identified future route of the emergency vehicle, where the identified future route is a planned route to an emergency destination for the emergency vehicle that includes a first pathway. In response to the SDV receiving the emergency message, the SDV is redirected, via an auto-control hardware system on the SDV, to drive to a second pathway that does not conflict with the identified future route of the emergency vehicle. In response to the receiver within the SDV receiving the emergency message, real-time current traffic patterns of a current location of the SDV are automatically transmitted to the emergency vehicle, where the real-time current traffic patterns are generated based on positioning signals generated by positioning systems in multiple SDVs that are in the current location of the SDV.

DETAILED DESCRIPTION

Figure 1:
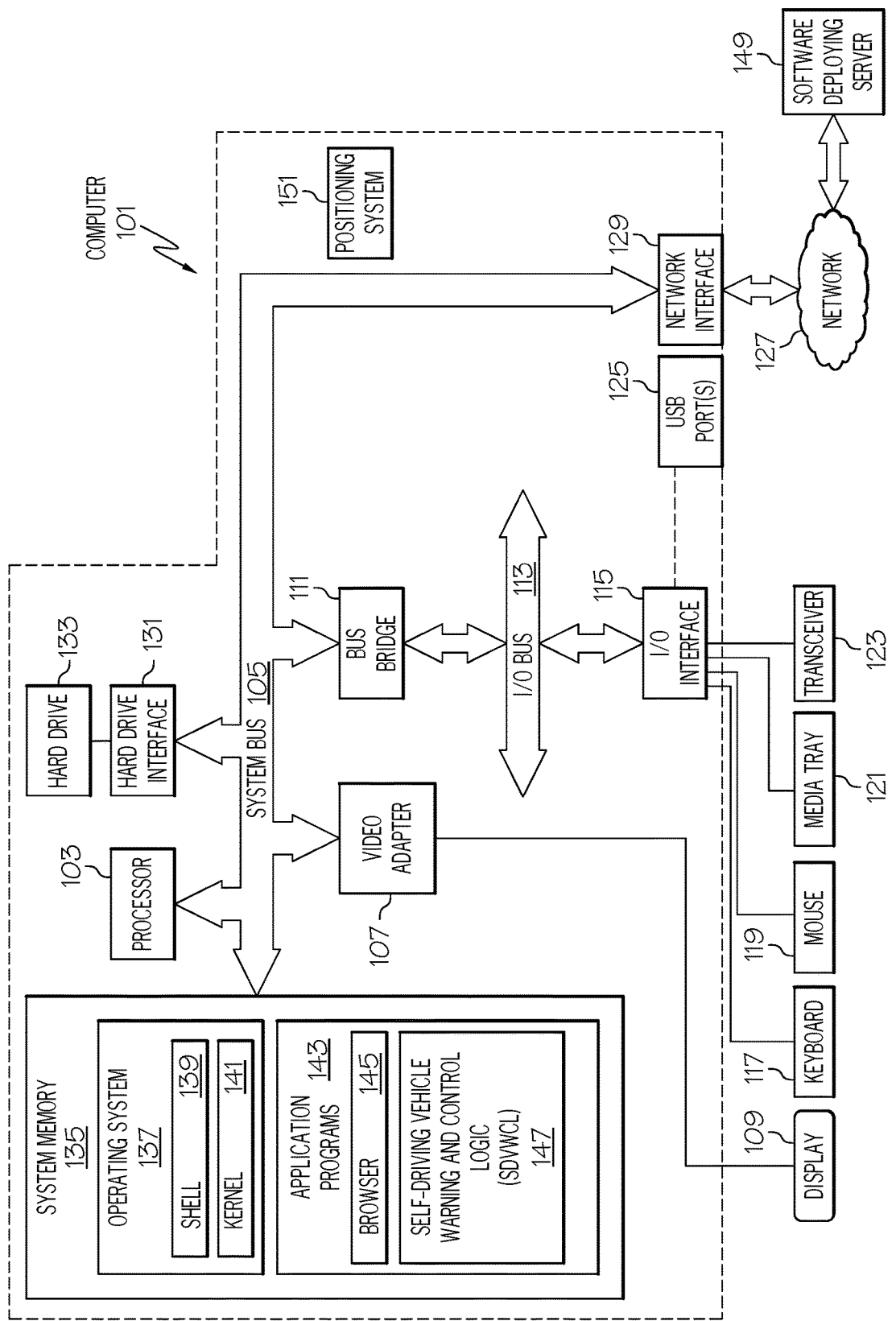
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating server 501, emergency vehicle 202, and/or self-driving vehicle (SDV) 206 depicted in FIG. 5 and other figures.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 5:
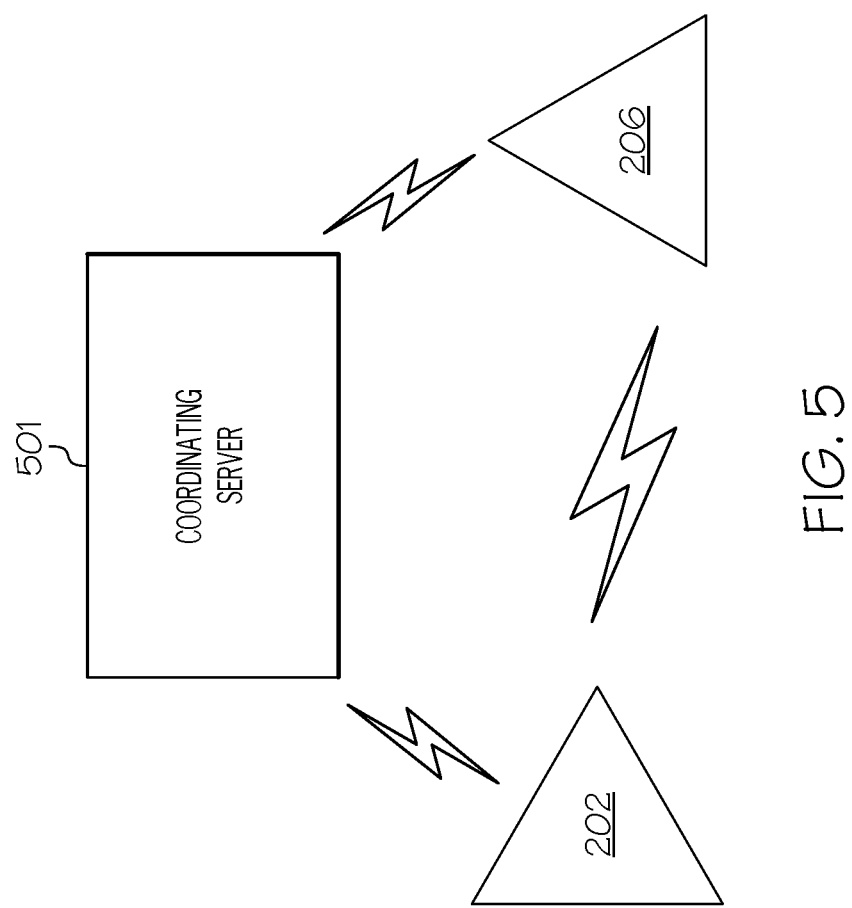
FIG. 5 depicts additional details of components used within an emergency vehicle in accordance with one or more embodiments of the present invention.

As depicted, computer 101 is able to communicate with a software deploying server 149 and/or other devices/systems (e.g., coordinating server 501, emergency vehicle 202, and/or self-driving vehicle (SDV) 206 depicted in FIG. 5 and other figures) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing.

While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Warning and Control Logic (SDVWCL) 147. SDVWCL 147 includes code for implementing the processes described below, including those described in FIGS. 2-6. In one embodiment, computer 101 is able to download SDVWCL 147 from software deploying server 149, including in an on-demand basis, wherein the code in SDVWCL 147 is not downloaded until needed for execution. In one embodiment of the present invention, software deploying server 149 performs all of the functions associated with the present invention (including execution of SDVWCL 147), thus freeing computer 101 from having to use its own internal computing resources to execute SDVWCL 147.

Also within computer 101 is a positioning system 151, which determines a real-time currently location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two or three dimensional locations.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
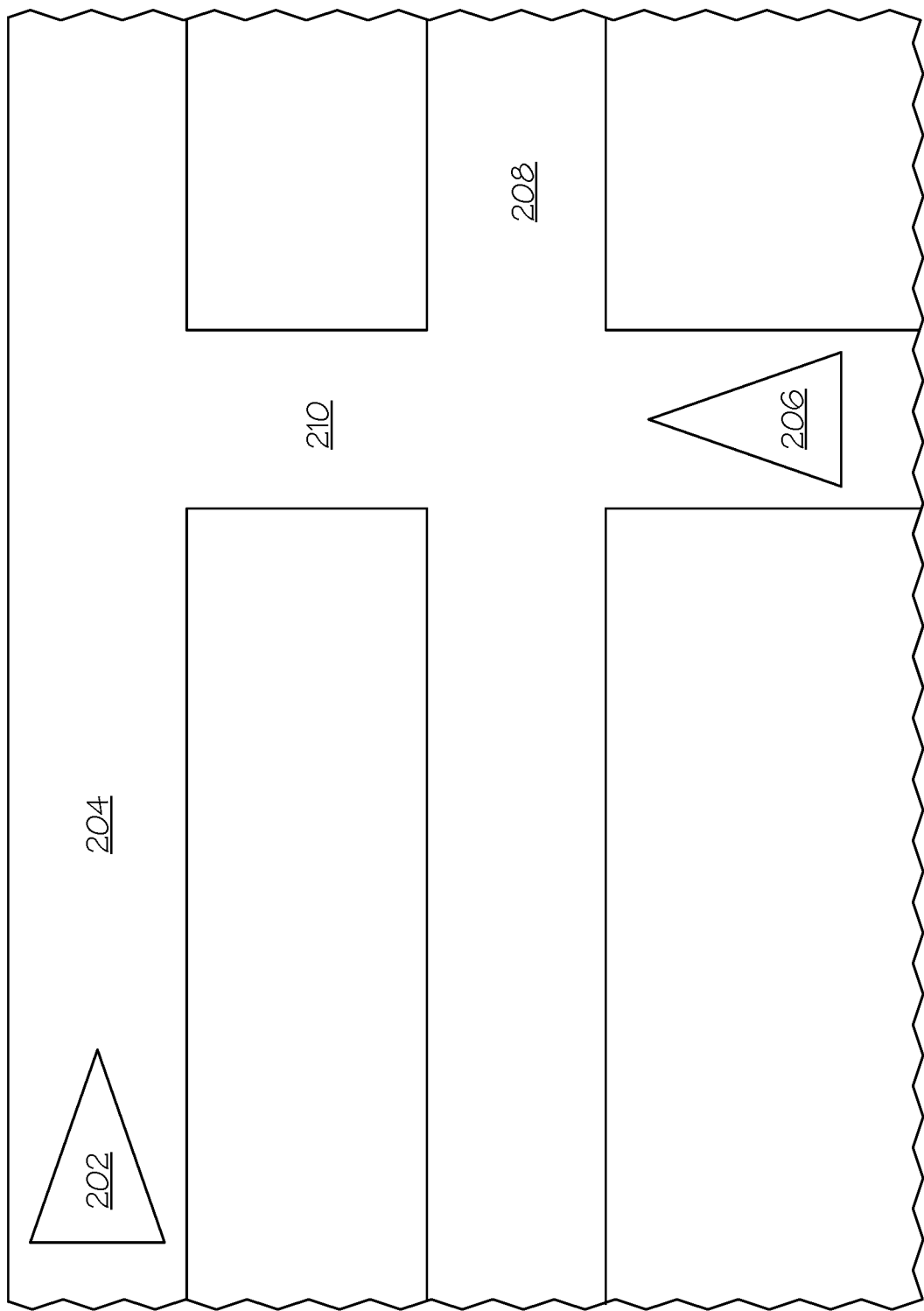
FIG. 2 illustrates an exemplary emergency vehicle and a self-driving vehicle (SDV) on a potential adverse course.

With reference now to FIG. 2, an exemplary emergency vehicle 202 and a self-driving vehicle (SDV) 206 are depicted as being on a potential adverse course. That is, assume that emergency vehicle 202 (e.g., an ambulance, a police vehicle, a fire truck, etc.) is traveling on street 204 on the way to the scene of an emergency (e.g., a fire, accident, sick/injured person, etc.). Assume further that SDV 206 is traveling on street 210, which intersects with street 204 (and thus the intended route of emergency vehicle 202). If SDV 206 continues along street 210, then there is a likelihood that SDV 206 will impede the progress of emergency vehicle 202, if not actually collide with emergency vehicle 202. Thus, the present invention places SDV 206 into an autonomous self-driving mode to redirect the SDV 206 to a location (e.g., turning onto street 208, stopping on street 210, slowing down to move to a location that does not enter street 204, etc.) that does not impede the progress of emergency vehicle 202. That is, the SDV 206 does not enter street 204 until the emergency vehicle 202 passes by.

As indicated by the name, SDV 206 is a vehicle that is capable of being self-driven in an autonomous manner. SDV 206 may be a land-based vehicle (i.e., an automobile, a truck, self-propelled construction equipment such as a crane, etc.), a waterborne vehicle (i.e., a boat), or an airborne vehicle (i.e., an airplane, a helicopter, etc.). As such, the emergency vehicle 202 may likewise be land-based (e.g., an ambulance whose travel may be impeded by an SDV car without the present invention), waterborne (e.g., a fire boat whose travel to a fire may be impeded by an SDV boat without the present invention), or even airborne (e.g., a medical helicopter whose travel to an emergency location or hospital may be impeded by an SDV airborne drone or SDV passenger helicopter without the present invention).

Figure 3:
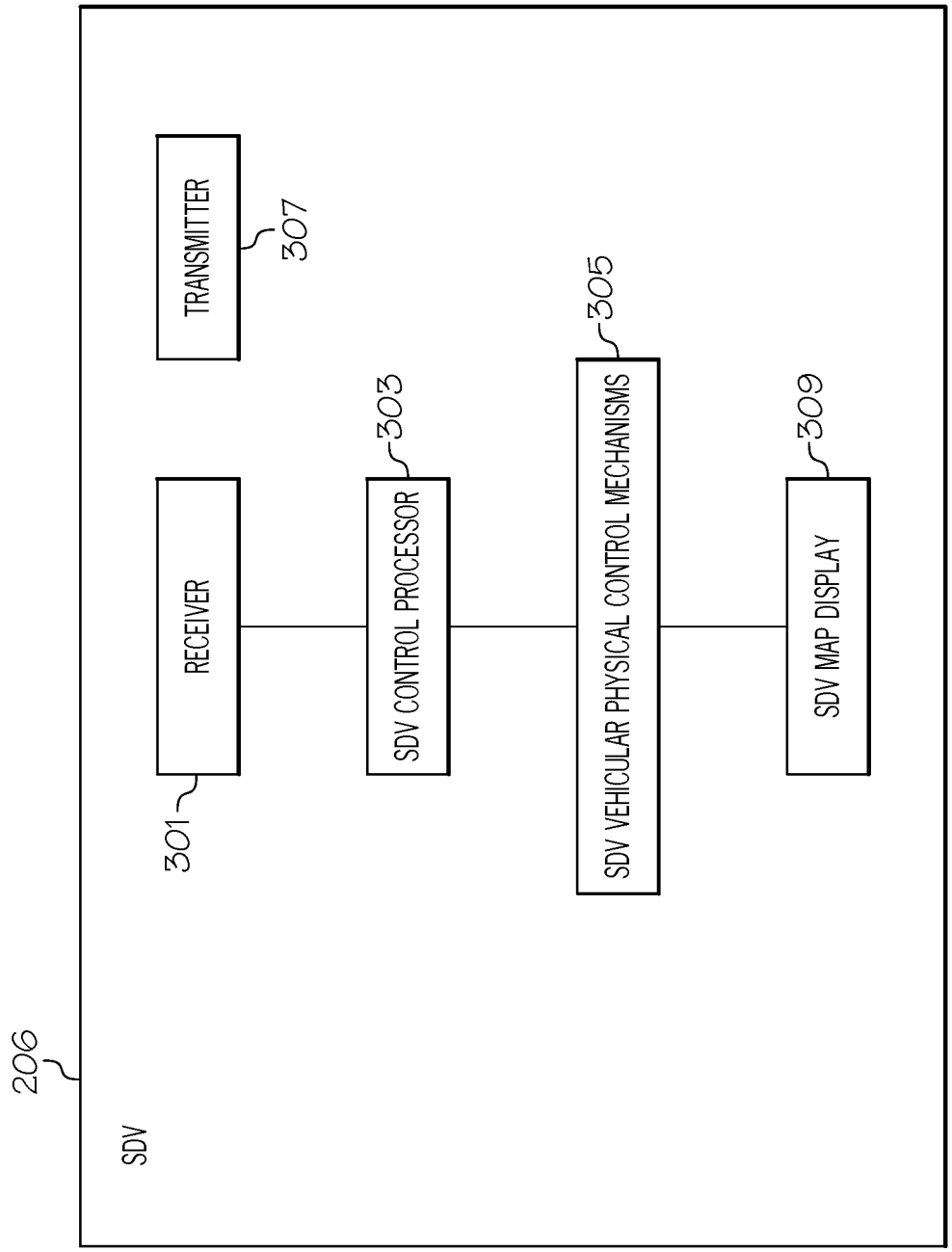
FIG. 3 depicts communication linkages among an emergency vehicle, an SDV, and a coordinating server.

With reference now to FIG. 3, additional detail of components used to control SDV 206 in accordance with one or more embodiments of the present invention is presented.

As depicted in FIG. 3, SDV 206 includes a receiver 301 (incorporating the receiving hardware found in analogous transceiver 123 depicted in FIG. 1). Receiver 301 is electronically coupled (wired or wirelessly) to an SDV control processor 303 (analogous to processor 103 shown in FIG. 1), which is electronically coupled to SDV vehicular physical control mechanisms 305.

SDV vehicular physical control mechanisms 305 include some or all of the physical components of SDV 206 required to control the movement of SDV 206. For example, if SDV 206 is a car, then SDV vehicular physical control mechanisms 305 may be a throttle (e.g., components used to control engine fuel injectors), a steering mechanism (e.g., rack-and-pinion steering linkage), a braking mechanism (e.g., disk brakes on the wheels), etc. That is, SDV vehicular physical control mechanisms 305 are physical components of SDV 206 that control its movement, including acceleration, steering, braking, etc.

Similarly, if SDV 206 is a boat, then SDV vehicular physical control mechanisms 305 may be a throttle (e.g., components used to control engine fuel injectors), a steering mechanism (e.g., a rudder), a reversing mechanism (e.g., reverse thrusters), etc. That is, SDV vehicular physical control mechanisms 305 are physical components of SDV 206 that control its movement, including acceleration, steering, reversing, etc.

Similarly, if SDV 206 is a drone, then SDV vehicular physical control mechanisms 305 may be a throttle (e.g., components used to control power to the drone's engines), a steering mechanism (e.g., cyclic control of rotary wings), an elevation control (i.e., collective control that adjusts the pitch of rotary wings to make the drone go up or down), etc. That is, SDV vehicular physical control mechanisms 305 are physical components of SDV 206 that control its movement, including acceleration, steering, elevation, etc.

As shown in FIG. 3 and described in further detail herein, SDV 206 may also include a transmitter (e.g., a transmitting component of the transceiver 123 shown in FIG. 1), which is able to transmit information messages to emergency vehicle 202 shown in FIG. 2 and/or coordinating server 501 shown in FIG. 5.

Also within SDV 206 is an SDV map display 309 (analogous to display 109 shown in FIG. 1), which is an electronic display capable of displaying a position of SDV 206 and/or emergency vehicle 202 and/or recommended alternative routes for SDV 206 on an electronic map.

Figure 4:
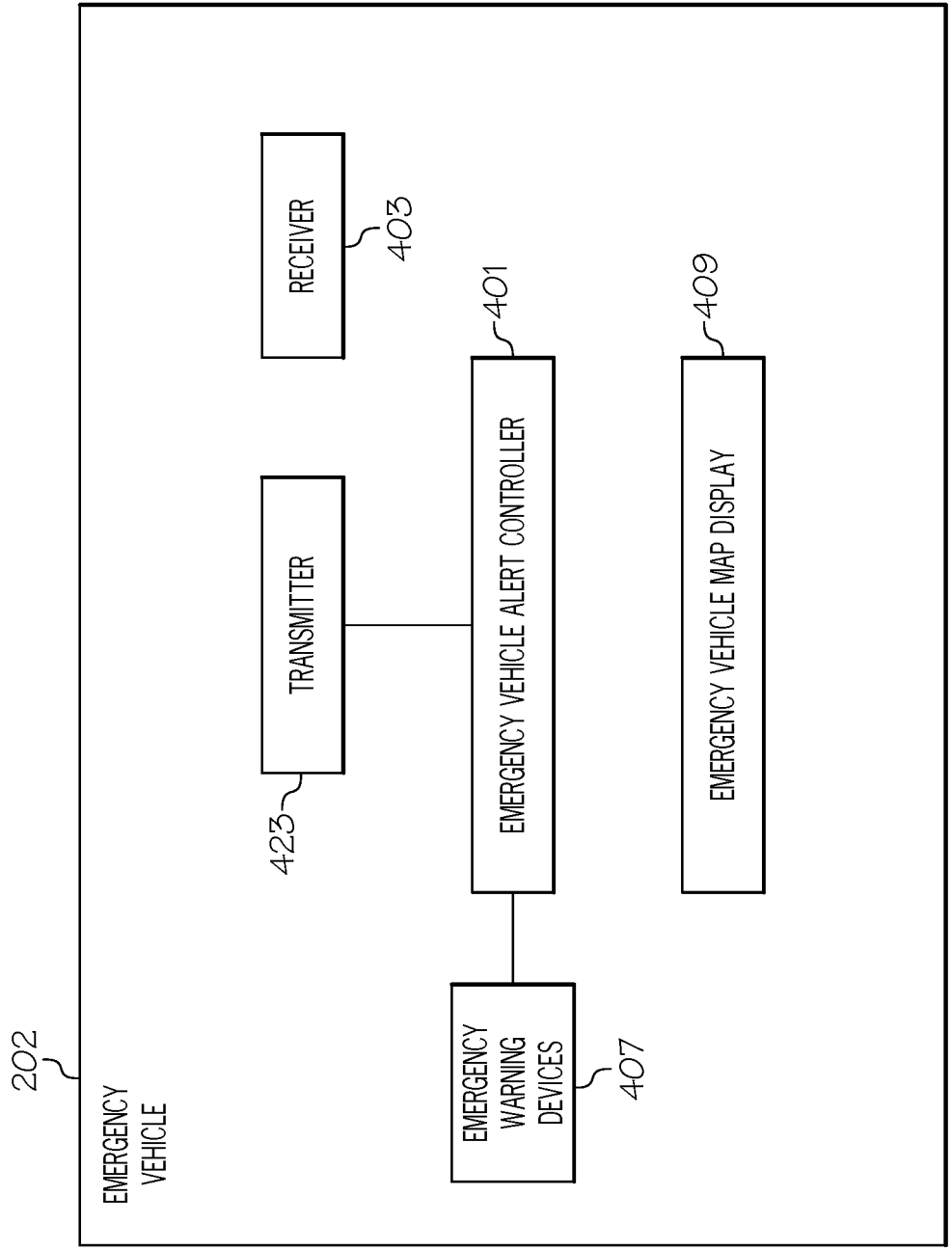
FIG. 4 illustrates additional details of components used within an SDV in accordance with one or more embodiments of the present invention.

With reference now to FIG. 4, additional detail of components used within emergency vehicle 202 in accordance with one or more embodiments of the present invention is presented.

A transmitter 423 (e.g., a transmitting component of the transceiver 123 shown in FIG. 1) allows the emergency vehicle 202 to transmit 1) an emergency status message of the emergency vehicle 202, and 2) a real-time position of the emergency vehicle 202. This information can come from an emergency vehicle alert controller 401 (analogous to computer 101 shown in FIG. 1), which determines and/or receives an indication of the emergency status of the emergency vehicle 202.

As shown in FIG. 4 and described in further detail herein, emergency vehicle 202 may also include a receiver (e.g., a receiving component of the transceiver 123 shown in FIG. 1), which is able to receive information messages from SDV 206 shown in FIG. 2 and/or coordinating server 501 shown in FIG. 5.

Also within emergency vehicle 202 is an emergency vehicle map display 409 (analogous to display 109 shown in FIG. 1), which is an electronic display capable of displaying a position of emergency vehicle 202 and/or SDV 206 and/or recommended alternative routes for emergency vehicle 202 on an electronic map.

With reference now to FIG. 5, communication linkages among emergency vehicle 202, SDV 206, and/or a coordinating server 501 are presented. That is, in one or more embodiments of the present invention, emergency vehicle 202 directly communicates with SDV 206, thus directing SDV 206 to adjust its route in order to avoid impeding the travel of emergency vehicle 202. In another embodiment however, all coordination of the movement of emergency vehicle 202 and/or SDV 206, as well as the establishment of an emergency state (and thus engagement of an autonomous self-driving mode in SDV 206), is achieved under the supervision of coordinating server 501.

Figure 6:
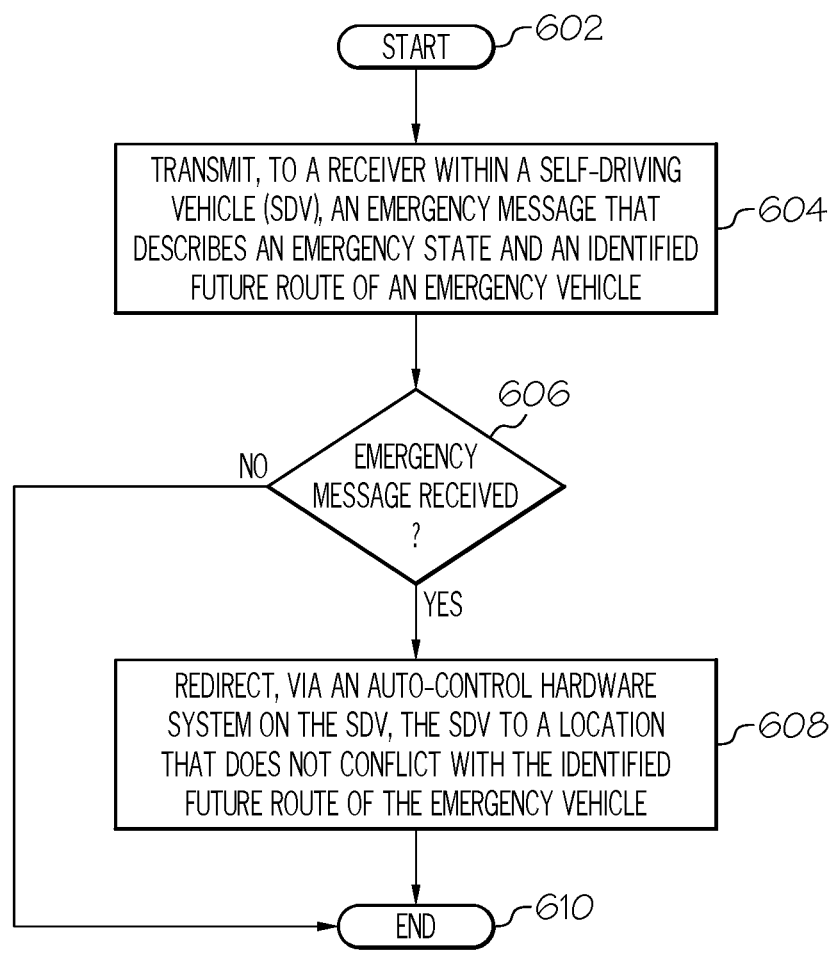
FIG. 6 is a high-level flow chart of one or more steps performed by one or more processors to control an SDV when proximate to an emergency vehicle.

With reference now to FIG. 6, a high-level flow chart of one or more steps performed by one or more processors to control an SDV when proximate to and/or in a position that may impede the travel of an emergency vehicle is presented.

After initiator block 602, an emergency vehicle (e.g., emergency vehicle 202 shown in FIG. 2) and/or a coordinating server (e.g., coordinating server 501 shown in FIG. 5) transmit an emergency message to a receiver (e.g., receiver 301 shown in FIG. 3) within a self-driving vehicle (SDV) (e.g., SDV 206 shown in FIG. 2), as described in block 604. This emergency message describes an emergency state of an emergency vehicle and an identified future route of the emergency vehicle. That is, the emergency message indicates that the emergency vehicle is on an emergency run, in which it needs to get to its destination as soon as safely possible, and it describes the present position of the emergency vehicle and the route that the emergency vehicle will be taking to get to its destination.

As indicated in query block 606, a determination is made as to whether or not the emergency message has been received by the SDV. If so, then the SDV is redirected, via an auto-control hardware system on the SDV (e.g., SDV control processor 303 along with the SDV vehicular physical control mechanisms 305 shown in FIG. 3), to a location that does not conflict with the identified future route of the emergency vehicle (see block 608). For example, the auto-control hardware system may automatically cause the SDV to pull over and/or stop on the side of road (e.g., pull over to the side of street 210 shown in FIG. 2); to slow down on its current street (e.g., slow down on street 210 shown in FIG. 2, such that emergency vehicle 202 is able to get past the intersection of street 204 and street 210 before the SDV 206 reaches that intersection); to turn down another street (e.g., to turn onto street 208 shown in FIG. 2, thus avoiding street 204 while the emergency vehicle 202 is nearby); etc.

The identified future route of the emergency vehicle may be identified/determined in various ways. For example, the emergency message may include a current real-time location of the emergency vehicle and a destination address of the emergency vehicle. Using this information, the intended route of the emergency vehicle can be derived and plotted on a digital map, or the planned route information can be transmitted.

Similarly, the identified future route of the emergency vehicle may be historic-based. That is, assume that the emergency vehicle is an ambulance that is returning from a call. If this ambulance is based at a particular hospital, then an assumption can be made that this particular hospital is the location/destination at the end of the identified future route (i.e., where the emergency vehicle is going) of the emergency vehicle.

Alternatively, assume that the patient in the ambulance is a trauma victim, and that the local county has one Level I trauma hospital. By inputting this information into the on-board system of the emergency vehicle (e.g., emergency vehicle alert controller 401 shown in FIG. 4), then the route from the current real-time position of the emergency vehicle to the Level I trauma hospital can be derived/identified.

The flow-chart shown in FIG. 6 ends at terminator block 610.

In an embodiment of the present invention, the SDV is initially operating in manual mode, such that the SDV is manually controlled by a driver of the SDV. Thus, in response to the receiver within the SDV receiving the emergency message, one or more processors (e.g., within the SDV) automatically switch control of the SDV from the manual mode to an autonomous mode, thereby allowing the autonomous mode to direct the auto-control hardware system on the SDV to autonomously control movement of the SDV. That is, initially the SDV is actually not self-driving, but rather is under the control of a person who is driving the vehicle, either on-board (e.g., if the SDV is a passenger vehicle) or remotely (e.g., if the SDV is a drone). However, once the SDV receives the emergency message from the emergency vehicle, directing the SDV and/or other vehicles to clear the pathway being taken by the emergency vehicle, the SDV goes into self-driving mode, such that the SDV is autonomously/automatically steered/moved/positioned to a location that will not impede the travel/route of the emergency vehicle. If the self-driving vehicle determines the manual driving mode is to remain in place, it informs the driver over voice, flash message and/or text and/or images/videos about the oncoming emergency vehicle and what she/he needs to do in order to allow the emergency vehicle to pass by safely. Moreover, if the self-driving car finds one or more obstacles on the lane/road on which the emergency vehicle is going to come, it informs the emergency vehicle of the same over network connection. It also attempts to inform the obstacle—if it is another vehicle or such other object, to clear the lane or road for the emergency vehicle.

In an embodiment of the present invention, the emergency vehicle and/or the supervisory server transmits, to the receiver within the SDV, a message describing the identified route of the emergency vehicle. This allows the SDV to determine autonomously the best evasive action to be taken. For example, if the emergency vehicle is on a route that is very close to the SDV, then the SDV may simply pull off to the shoulder on the side of the road. However, if the emergency vehicle is on an identified route that is far enough away from the SDV, then the SDV can slow down, turn down a side street, or continue and monitor the position of the emergency vehicle, etc.

In an embodiment of the present invention, the emergency message (describing the emergency state of the emergency vehicle) is transmitted (from the emergency vehicle or a supervisory system/server/computer) to the receiver within the SDV in response to a warning system being activated within the emergency vehicle, where the warning system warns the SDV of an emergency state of the emergency vehicle. For example, the emergency vehicle alert controller 401 shown in FIG. 4 may turn on flashing lights and a siren on the emergency vehicle (depicted as emergency warning devices 407 in FIG. 4), as well as automatically transmitting the emergency message to the SDV via the transmitter 423. That is, activation of the siren/flashing lights occurs at the same time that the warning emergency message is sent to the SDV.

In an embodiment of the present invention, one or more processors (within the SDV 206 and/or the coordinating server 501 shown in FIG. 5) adjust a level of autonomous control of the SDV by the auto-control hardware system on the SDV based on traits of non-driver occupants in the SDV. For example, assume that a profile containing traits of non-driver occupants (e.g., passengers, pets, children, fragile cargo, etc.) shows that a sudden braking or other movement of the SDV may result in injury/damage to the occupants. That is, if an occupant is a small unrestrained dog, then sudden braking may result in the dog being thrown to the floor of the vehicle. As such, the auto-control hardware system (e.g., SDV control processor 303 and SDV vehicular physical control mechanisms 305 shown in FIG. 3) will bring the SDV to a stop more slowly than if the dog was not in the SDV.

In an embodiment of the present invention, one or more processors (e.g., within the SDV 206 and/or the coordinating server 501 shown in FIG. 5) retrieve data describing historic traffic patterns of the identified route and then adjust, using the auto-control hardware system on the SDV, the redirection of the SDV according to the historic traffic patterns of the identified route. For example, assume that historical data shows that street 208 in FIG. 2 is always backed-up at a certain time of day/week. If the SDV 206 is approaching the intended route of the emergency vehicle 202 at that time of day/week, then the system will not put the SDV 206 onto street 208, but rather will cause it to slow down, pull off to the shoulder of street 210, etc., rather than adding SDV 206 to the backup on street 208.

In an embodiment of the present invention, in response to the receiver within the SDV receiving the emergency message, real-time current traffic patterns of a current location of the SDV are automatically transmitted to the emergency vehicle. For example, in FIG. 2, assume that traffic is currently backed up on street 210. SDV 206 will broadcast this information to emergency vehicle 202 (either directly or via the coordinating server 501 shown in FIG. 5), thus letting the emergency vehicle 202 know that it is inadvisable to turn down street 210.

In an embodiment of the present invention, in response to receivers within multiple SDVs receiving the emergency message, multiple processors automatically transmit real-time current traffic patterns of current locations of the multiple SDVs to the emergency vehicle. That is, rather than just moving a single SDV out of the path of the emergency vehicle, a coordinated movement of multiple SDVs will clear a pathway for the emergency vehicle, thus overcoming the problem of any one SDV having no place to move to.

Thus, in an embodiment of the present invention, real-time current traffic patterns of current locations of the multiple SDVs are received (e.g., by the coordinating server 501 shown in FIG. 5) from multiple SDVs along the identified route of the emergency vehicle. Using auto-control hardware systems on the multiple SDVs, the SDVs are redirected to positions that clear out a new route for the emergency vehicle. A redirection message is then sent to the emergency vehicle, which redirects the emergency vehicle to the new route. For example, if multiple SDVs are traveling on street 204 in FIG. 2, and street 204 is the intended route for the emergency vehicle 202, then these other SDVs (not shown in FIG. 2) will instruct the emergency vehicle 202 to take an alternate route (e.g., streets 210 and 208).

In an embodiment of the present invention, the SDV is equipped with a minimum spacing device that automatically maintains a predefined minimum distance between the SDV and another vehicle. In this embodiment, in response to the SDV receiving the emergency message, the predefined minimum distance between the SDV and the other vehicle is adjusted/modified. For example, assume that the SDV has a system that maintains a 100-foot cushion around the SDV whenever the SDV is traveling at a speed of 30 miles per hour. While this amount of cushion will certainly ensure that the SDV will not rear end another vehicle or be rear-ended itself, it dramatically slows down (and thus increases) traffic on the street. Thus, when an emergency vehicle is in an "emergency state" as described herein, the buffer around the SDV will be shrunk, allowing a pathway to be created for the emergency vehicle to travel through.

As described herein, the present invention communicatively couples one or more emergency vehicles and at least one SDV (self-driving vehicle). The emergency vehicle, when in alerting mode (e.g., a siren is on), communicates a verification signal to the SDV indicating that automatic driving mode is required. The vehicle responds by confirming receipt of the verification signal, and switches into automatic driving mode (unless overridden by the human driver or by other conditions that require manual driving), thus moving out of the emergency vehicle's path in concert with other vehicles.

As described herein in one or more embodiments, the emergency vehicle enters emergency alerting mode (e.g., siren is on), and then broadcasts a verification signal to all SDVs within the vicinity of the emergency vehicle. The SDVs detect the verification signal and switch to automatic driving mode automatically (unless overridden by the human driver or by other conditions that require manual driving) and modify at least one driving behavior (of the SDV) in order to organize a concerted effort of clearing a path for the emergency vehicle.

In an embodiment of the present invention, the SDV's destination location is modified if it interferes with the destination of the emergency vehicle. For example, assume that the emergency vehicle is headed to a car fire. Even if the SDV will not interfere with the emergency vehicle as it is traveling to the car fire, the SDV will nonetheless be redirected away from the car fire, in order to avoid interfering with the work of the emergency responders to the car fire.

In one embodiment, when an emergency vehicle determines the route from its location to destination, it informs all the SDVs on that route using a central server or by adhoc routing among SDVs. The SDVs then engage in a concerted effort to clear a lane a few minutes before the emergency vehicle arrives. If there are reports of issues and incidents reported by SDVs along the route, the emergency vehicle updates the route based on its policy. The policy specifies the priority of issues and incidents reported by SDVs and whether or not to change routes based on this policy.

In one embodiment of the present invention, a weighted voting system is used to weight the various variables used in making the decisions regarding SDV mode and movement. Such inputs may include: a history of pedestrians wishing to cross at a particular intersection or point in a road, the distance a pedestrian is from the side of the road, other cars stopping nearby to allow pedestrian crossings, votes by nearby cars, etc. Such weighted voting approaches may be characterized primarily by three aspects—the inputs, the weights, and the quota. The inputs are (I1, I2, . . . IN), where "N" denotes the total number of inputs. An input's weight (w) is the number of "votes" associated with the input. A quota (q) is the minimum number of votes required to "pass a motion", which in this case refers to a decision made by the SDV to alter its route.

In one embodiment of the present invention, active learning is employed to enable the system to learn from experiences of many SDVs and/or drivers (e.g., in different geographies and among cohorts). Geographies include, but are not limited to, cities, rural areas, etc. Cohorts include, but are not limited to, persons having the same or similar certain characteristics, histories, distraction levels, etc.

For example, assume that historical data shows that SDVs have a history of having to get out of the way of emergency vehicles at a particular intersection (e.g., near a hospital). As such, one embodiment of the present invention uses this historical data to predict (anticipate) the presence of an emergency vehicle whenever the SDV approaches this intersection, thus prompting the SDV to initiate preliminary steps to prepare the SDV for entering an autonomous driving mode.

Similarly, historical data may show that emergency vehicles are prevalent in an urban area, but rare in a rural area. As such, the system will anticipate (e.g., perform initial steps to prepare the SDV to enter autonomous control mode) the need to go into SDV autonomous mode and/or alter the route of the SDV in urban areas, but not in rural areas.

With regard to cohorts, assume that a particular driver/occupant of an SDV has a characteristic (i.e., trait) found in other members of a cohort that affects the drivers' ability to respond to emergency vehicles. For example, assume that the driver/occupant of SDV 206 shown in FIG. 2 has a neurological disorder that makes quick reactions difficult. Assume further that a cohort of drivers/occupants of other SDVs is made of persons having this same neurological disorder, and that historical data shows that these cohort members have a history of accidents with emergency vehicles when auto-control is 1) not activated or 2) not available on the vehicle that the person was driving. As such, the system will anticipate that the SDV 206 needs to institute the autonomous control system described herein automatically whenever an emergency vehicle is detected nearby.

Thus, in one embodiment of the present invention, one or more processors assign a driver of the SDV to a cohort of SDV drivers that each have (share) a particular trait, and then adjust a level of autonomous control of the SDV by the auto-control hardware system on the SDV based on traits of non-driver occupants in the SDV.

Furthermore, in one embodiment of the present invention, one or more processors retrieve historical data related to (i.e., that describes) a frequency of activation of the autonomous mode in other SDVs in a particular geography, and then adjust a level of autonomous control of the SDV by the auto-control hardware system on the SDV based on the frequency of activation of the autonomous mode in the other SDVs in the particular geography.

The present invention provides multiple advantages over the prior art. For example and as described herein, emergency vehicles (or supervisory systems) not only alert SDVs of the presence of the emergency vehicle, but also orchestrate a concerted clearing of a path for the emergency vehicle, even if this means directing the SDVs to keep driving (e.g., along a narrow street or alleyway).

Automatic switching to automatic driving mode means that drivers' emotional responses become secondary, such that sirens and flashing lights on the emergency vehicle become less important.

The automatic switching to SDV mode described herein makes it no longer necessary for the driver to actually hear or see the warning signals (sirens/flashing lights) on the emergency vehicle, which can be difficult to detect in a vehicle in which loud music is playing, ambient lighting masks the flashing lights on the emergency vehicle (e.g., flashing neon signs along the road), etc.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
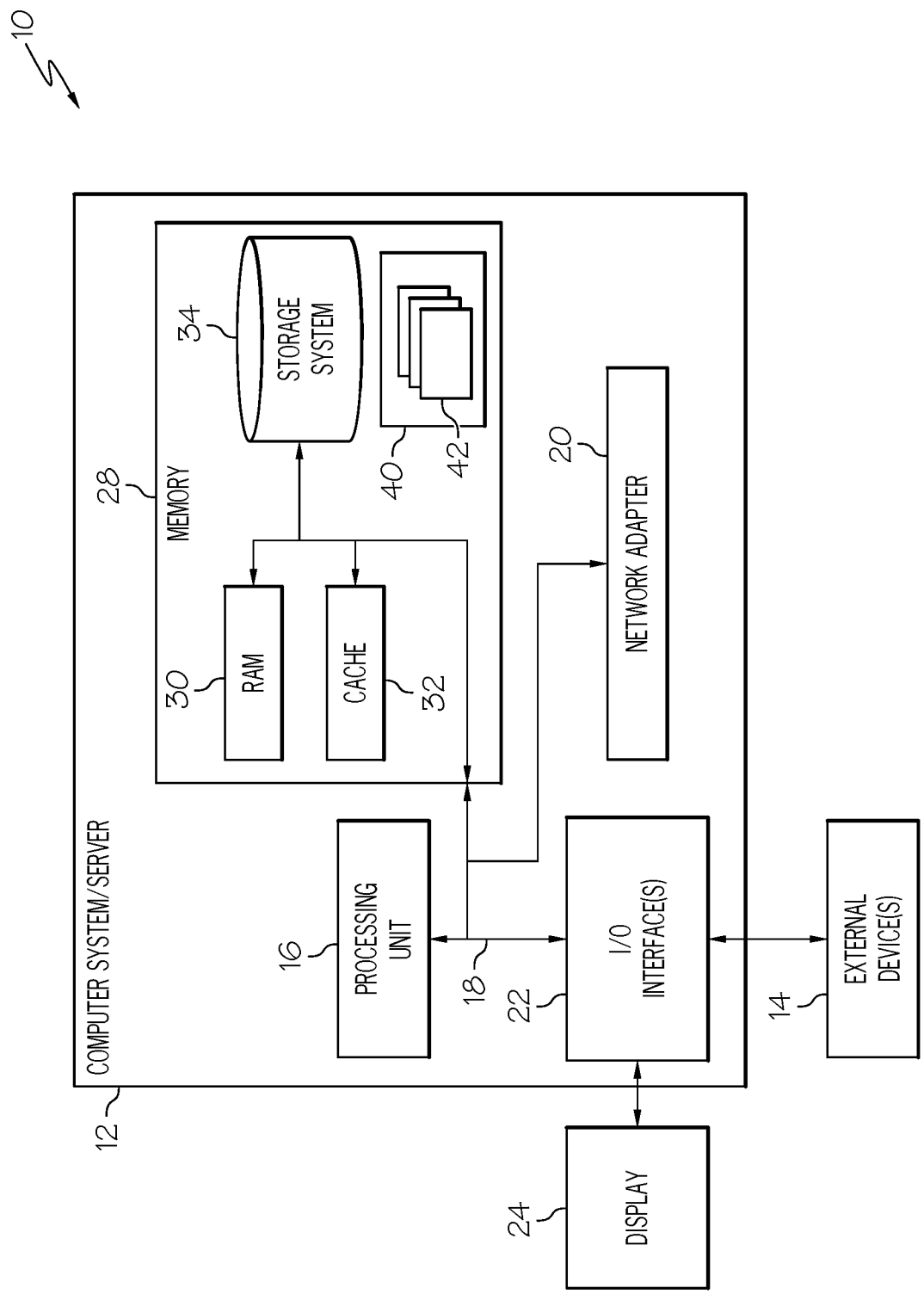
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
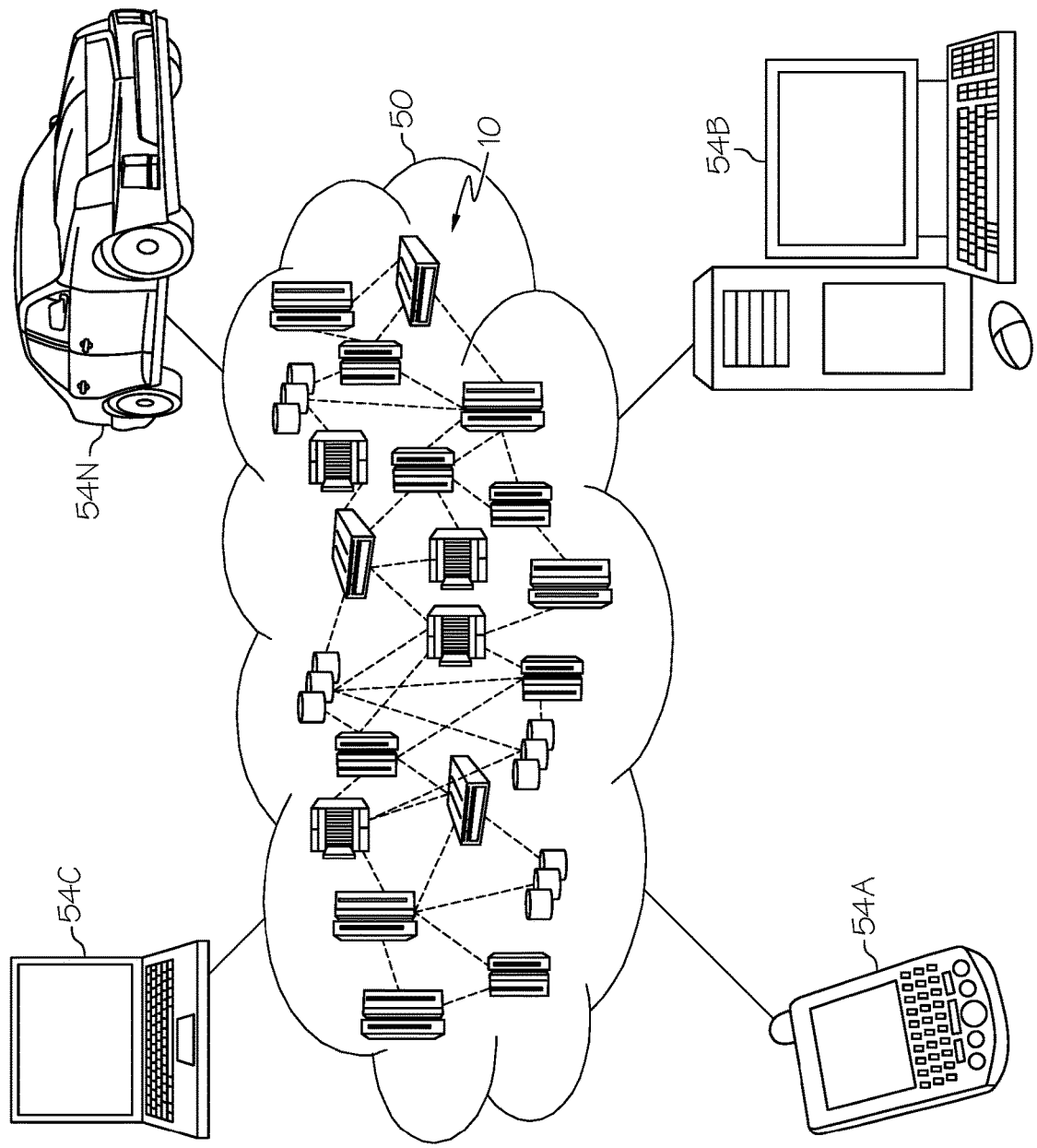
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
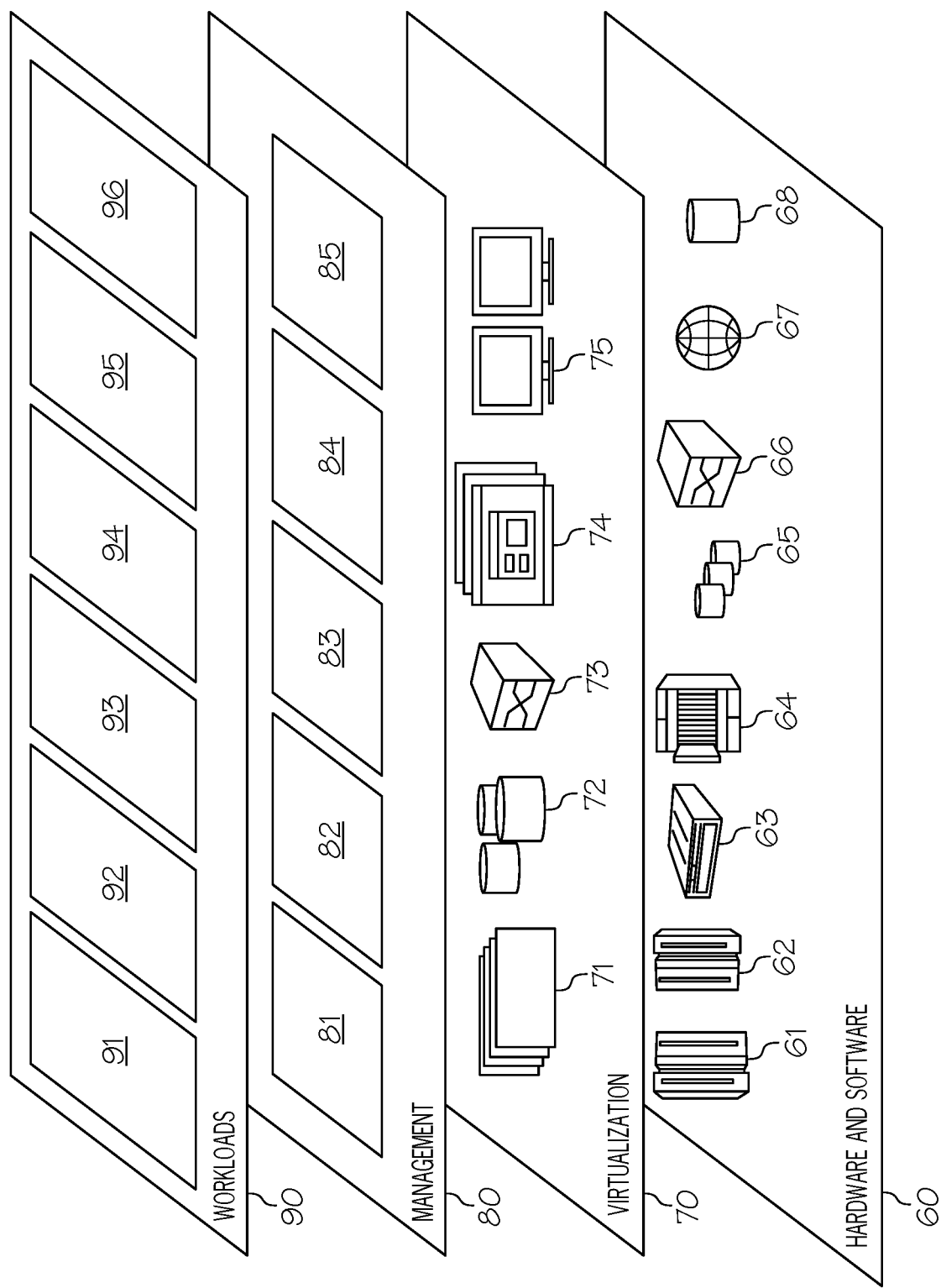
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for directing SDVs away from emergency vehicles as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed:

1. A method comprising:
   receiving, at a receiver associated with a self-driving vehicle (SDV), a message including a current location of an emergency vehicle that is responding to an emergency and a planned route for the emergency vehicle that includes a first street;
   determining that the SDV will impede the emergency vehicle on the first street based on a currently planned route of the SDV;
   automatically controlling the SDV to take a second street, parallel to the first street, and thereby avoid impeding the emergency vehicle; and
   transmitting, to a server associated with the emergency vehicle, a traffic information message informing traffic pattern conditions existing proximate the SDV and predictable to impede the emergency vehicle on the currently planned route.

2. The method of claim 1, wherein the SDV is initially operating in manual mode in which the SDV is manually controlled by a human driver of the SDV, and wherein the method of claim 1 further comprises:
   switching the SDV from the manual mode to an autonomous mode.

3. The method of claim 1, further comprising:
   retrieving historical data associated with traffic pattern conditions of the planned route for the emergency vehicle; and
   adjusting the currently planned route of the SDV based on the historical data associated with the traffic pattern conditions of the planned route for the emergency vehicle.

4. The method of claim 1, further comprising:
   adjusting a distance between the SDV and another vehicle around the SDV based on a predefined minimum distance, wherein the predefined minimum distance is wide enough to allow the emergency vehicle to pass through between the SDV and the another vehicle.

5. A non-transitory computer readable storage medium comprising computer-readable instructions, which when executed by a computing system, cause the computing system to:
   receive, at a receiver associated with a self-driving vehicle (SDV), a message including a current location of an emergency vehicle that is responding to an emergency and a planned route for the emergency vehicle that includes a first street;
   determine that the SDV will impede the emergency vehicle on the first street based on a currently planned route of the SDV;
   automatically control the SDV to take a second street, parallel to the first street, and thereby avoid impeding the emergency vehicle; and
   transmit, to a server associated with the emergency vehicle, a traffic information message informing traffic pattern conditions existing proximate the SDV and predictable to impede the emergency vehicle on the currently planned route.

6. The non-transitory computer readable storage medium of claim 5, wherein the SDV is initially operating in manual mode in which the SDV is manually controlled by a human driver of the SDV, and wherein the instructions, which when executed by the computing system, further cause the computing system to:
   switch the SDV from the manual mode to an autonomous mode.

7. The non-transitory computer readable storage medium of claim 5, wherein the instructions, which when executed by the computing system, further cause the computing system to:
   adjust a distance between the SDV and another vehicle around the SDV based on a predefined minimum distance, wherein the predefined minimum distance is wide enough to allow the emergency vehicle to pass through between the SDV and the another vehicle.

8. A computer system comprising:
   a processor; and
   a computer readable medium comprising instructions stored therein, which when executed by the processor, cause the processor to:
   receive, at a receiver associated with a self-driving vehicle (SDV), a message including a current location of of an emergency vehicle that is responding to an emergency and a planned route of the emergency vehicle that includes a first street;
   determine that the SDV will impede the emergency vehicle on the first street based on a currently planned route of the SDV;
   automatically control the SDV to take a second street, parallel to the first street, and thereby avoid impeding the emergency vehicle; and
   transmit, to a server associated with the emergency vehicle, a traffic information message informing traffic pattern conditions existing proximate the SDV and predictable to impede the emergency vehicle on the currently planned route.

9. The computer system of claim 8, wherein the SDV is initially operating in manual mode in which the SDV is manually controlled by a human driver of the SDV, and wherein the instructions, which when executed by the processor, further cause the processor to:
   switch the SDV from the manual mode to an autonomous mode.

10. The computer system of claim 8, wherein the instructions, which when executed by the processor, further cause the processor to:
    adjust a distance between the SDV and another vehicle around the SDV based on a predefined minimum distance, wherein the predefined minimum distance is wide enough to allow the emergency vehicle to pass through between the SDV and the another vehicle.

11. The method of claim 1, wherein the message includes a destination of the emergency vehicle, the method further comprising:
    predicting the planned route of the emergency vehicle based on the message.

12. The method of claim 1, further comprising:
    determining a presence of one or more obstacles on the planned route of the emergency vehicle, wherein the traffic information message includes the presence of the one or more obstacles along the planned route of the emergency vehicle.

13. The method of claim 1, wherein the message further includes a profile of an occupant of the emergency vehicle.

14. The method of claim 2, further comprising:
adjusting a level of autonomous control of the autonomous mode based on one or more characteristics of an occupant in the SDV.

15. The non-transitory computer readable storage medium of claim 5, wherein the instructions, which when executed by the computing system, further cause the computing system to:
determine a presence of one or more obstacles on the planned route of the emergency vehicle, wherein the traffic information message includes the presence of the one or more obstacles along the planned route of the emergency vehicle.

16. The non-transitory computer readable storage medium of claim 5, wherein the message further includes a profile of an occupant of the emergency vehicle.

17. The non-transitory computer readable storage medium of claim 6, wherein the instructions, which when executed by the computing system, further cause the computing system to:
adjust a level of autonomous control of the autonomous mode based on one or more characteristics of an occupant in the SDV.

18. The computer system of claim 8, wherein the instructions, which when executed by the processor, further cause the processor to:
determine a presence of one or more obstacles on the planned route of the emergency vehicle, wherein the traffic information message includes the presence of the one or more obstacles along the planned route of the emergency vehicle.

19. The computer system of claim 9, wherein the message further includes a profile of an occupant of the emergency vehicle.

20. The computer system of claim 9, wherein the instructions, which when executed by the processor, further cause the processor to:
adjust a level of autonomous control of the autonomous mode based on one or more characteristics of an occupant in the SDV.

* * * * *